United States Patent [19]

Espinosa

[11] 4,129,857
[45] Dec. 12, 1978

[54] PORTABLE DRIVER EMERGENCY DEVICE
[76] Inventor: Albert Espinosa, 838 Riverside Dr., New York, N.Y. 10032
[21] Appl. No.: 800,974
[22] Filed: May 26, 1977
[51] Int. Cl.² .............................................. B60Q 7/00
[52] U.S. Cl. ...................................... 340/321; 40/490; 40/593; 340/90; 340/107; 340/330
[58] Field of Search .................... 340/107, 144, 87, 90, 340/321, 331, 330, 97; 40/125 F, 130 R, 130 L, 129 C, 63 R, 64 R, 65, 556, 592, 593, 591, 490, 491; 116/28 R, 42, 45

[56] References Cited
U.S. PATENT DOCUMENTS

| | | | |
|---|---|---|---|
| 1,289,982 | 12/1918 | Webber | 340/330 |
| 2,343,009 | 2/1944 | Hall | 340/330 |
| 2,559,163 | 7/1951 | MacDonald | 340/87 |
| 3,916,378 | 10/1975 | Kennedy | 340/107 |

FOREIGN PATENT DOCUMENTS 646230  9/1962  Italy ........................................ 340/321

Primary Examiner—John W. Caldwell, Sr.
Assistant Examiner—James J. Groody
Attorney, Agent, or Firm—Allison C. Collard; Thomas M. Galgano

[57] ABSTRACT

A portable emergency signaling device includes a relatively lightweight hollow housing having an opening therein, a translucent message board slidably mounted on the housing across the opening thereof, a clock dial mounted on the housing for use in association with the message board, a first light source mounted within the housing and disposed behind the message board for effecting illumination thereof, and at least one second light source mounted on the housing and serially connected to a flasher for signaling a blinking distress signal. The first light source and the second light source and flasher are connected in parallel and are coupled to an electrical power source and a switch is provided for activating and deactivating the device. The device is specifically intended as an automobile emergency aid.

8 Claims, 4 Drawing Figures

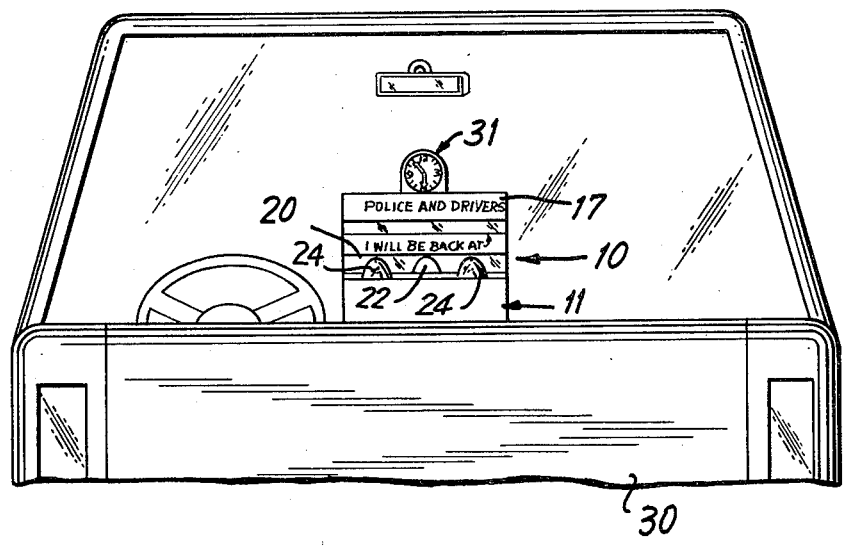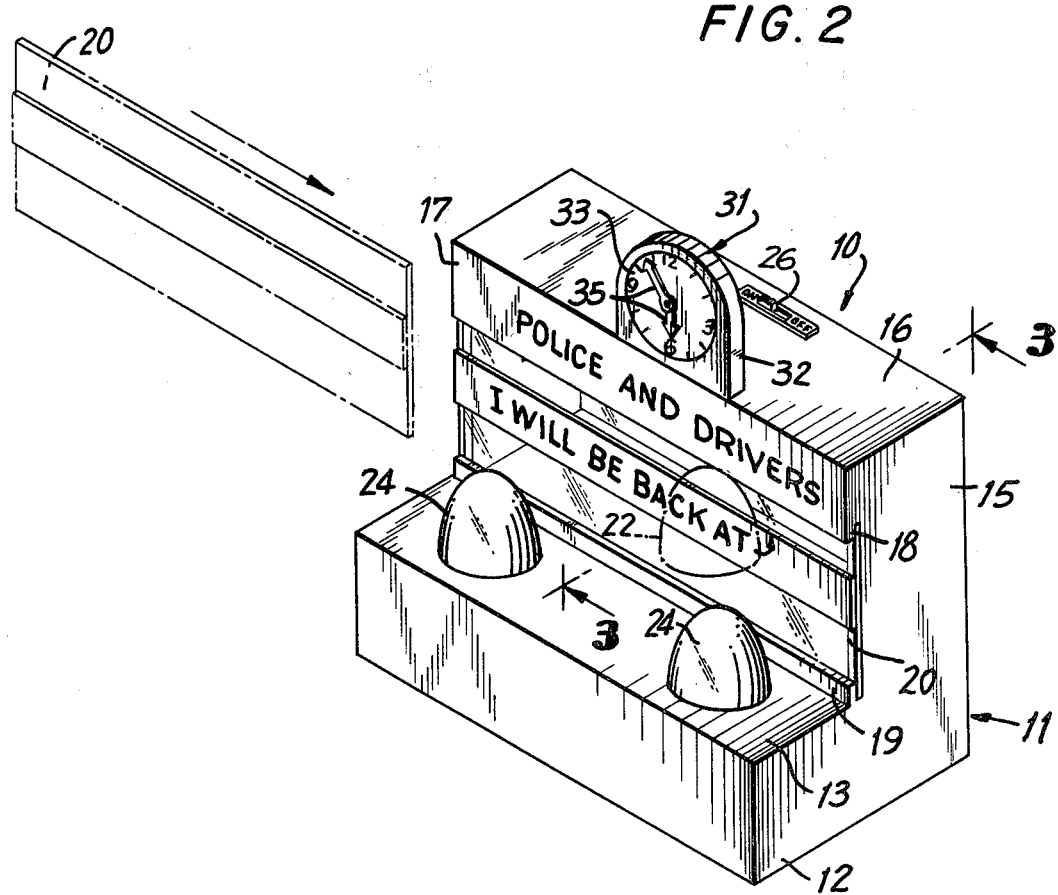

PORTABLE DRIVER EMERGENCY DEVICE

This invention relates to a portable emergency signaling device. More particularly, it relates to a portable emergency signaling device especially intended for use as an automobile emergency aid.

Emergency signaling devices for automobiles are well known and widely used. Typically, they consist of a battery-operated flashing light, which may be mounted on the dashboard or the ledge behind the back seat of the vehicle passenger compartment. Recently, such flashing signaling devices have been incorporated into the parking and/or braking lights of the vehicles and are operated by means of a switch on the steering column. While such devices are generally satisfactory, they are found to have certain disadvantages. In particular, while they do afford a highly visible distress signal, if the driver should leave his vehicle, any passing policeman, tow-truck operator, or motorist stopping to investigate the distress signal, will not be able to ascertain what the problem is nor where the driver has gone.

Accordingly, it is an object of the present invention to provide a portable emergency signal device which, in addition to projecting a highly-visible distress signal, also projects a highly-visible emergency message to passersby.

It is also an object of this invention to provide such a device which is relatively lightweight, durable and of inexpensive construction.

It is a more particular object of this invention to provide such a device having the foregoing attributes and characteristics, which is especially intended for use as an emergency automobile aid.

Certain of the foregoing and related objects are readily attained in a portable emergency signaling device, which includes a relatively lightweight hollow housing, having an opening therein, a translucent message board slidably mounted on the housing across the opening thereof, and clock means mounted upon the housing for use in association with the message board. A first light source is mounted within the housing and is disposed behind the message board for effecting illumination thereof, and at least one second light source is mounted on the housing for signaling a distress signal and which is connected in parallel with the first light source. A flasher is mounted on the housing and serially connected to the second light source for effecting a blinking signal. The device further includes an electrical power source mounted within the housing and serially connected to the flasher and light sources, and switch means mounted on the housing and serially connected to the power source, light sources and flasher for activating and deactivating the device.

Preferably, the housing has a generally L-shaped, elongated configuration and includes a generally rectangular hollow base having a top face, the front portion of which serves as a ledge. A generally rectangular hollow member is connected to, and extends upwardly from, the rear portion of the top face of the base, and has a top face which also serves as a ledge and a front face disposed adjacent to the forward portion of the top face of the base, in which the opening is defined. The front face of the member includes means for slidably mounting the message board across the opening thereof.

Most desirably, the clock means and switch means are mounted on the top face of the member housing, and the flasher and power source are mounted within the base. Most advantageously, the first light source is mounted within the member behind the message board and the second light source is mounted on the forward portion of the top base of the base.

In the particularly preferred embodiments of the invention, the device also includes an additional second light source mounted on the forward portion of the top face of the base, spaced from the other second light source. Most advantageously, red colored, translucent domes cover each of the second light sources. Preferably, the electrical power source comprises a battery and the light sources comprise light bulbs. Finally, it is most advantageous that the base of the housing have a removable bottom face.

Other objects and features of the present invention will become apparent from the following detailed description considered in connection with the accompanying drawings, which disclose a single embodiment of the invention. It is to be understood, however, that the drawings are designed for the purpose of illustration only and are not as a definition of the limits of the invention.

FIG. 1 is a fragmentarily-illustrated, rear elevational view of an automobile, in which the portable emergency signaling device embodying the present invention, is mounted;

FIG. 2 is a perspective view of the emergency signaling device shown in FIG. 1 and showing, in phantom line, the slidable mounting of the message board onto the housing of the unit;

Figure 3:
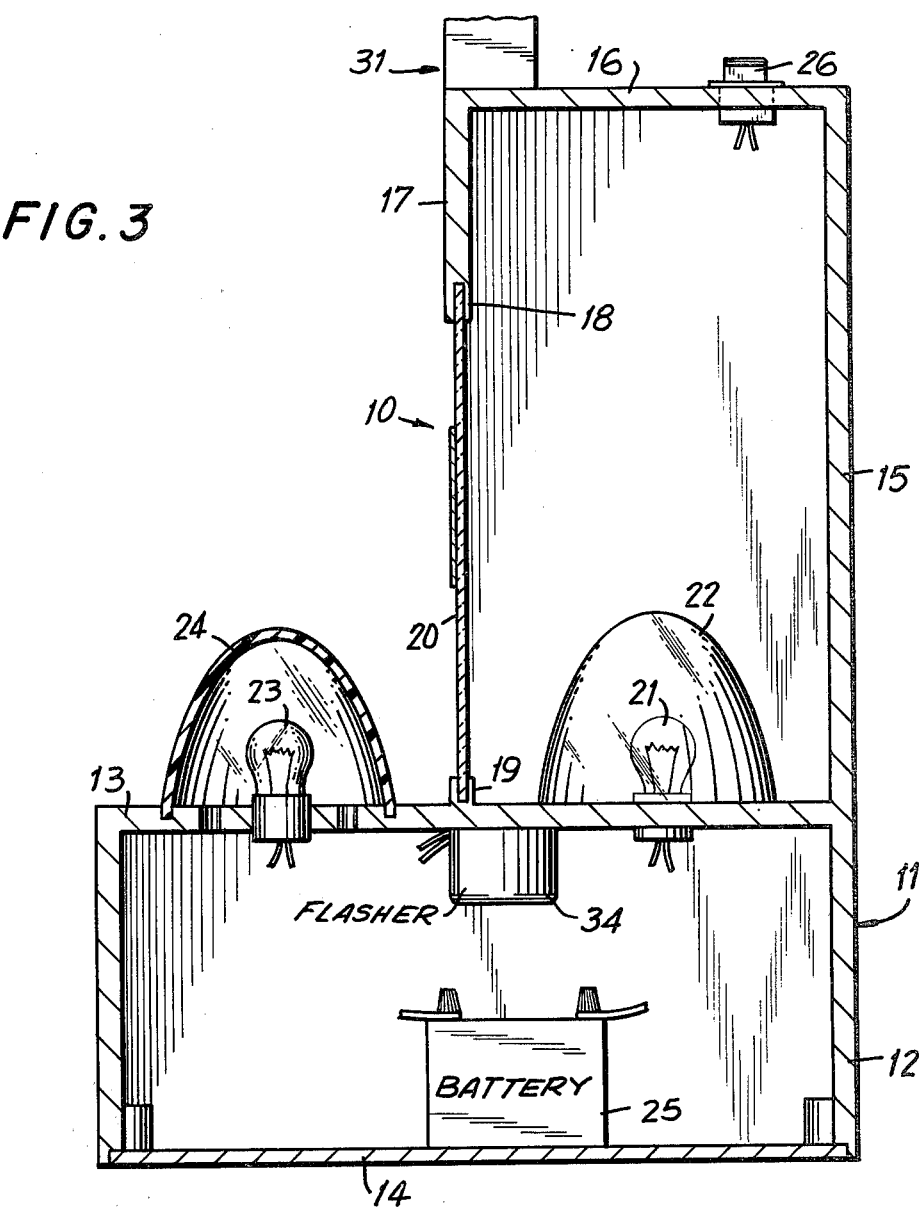
FIG. 3 is a cross-sectional view of the device, taken along line 3—3 of FIG. 2.

Turning now in detail to the appended drawings, therein illustrated is a portable emergency signaling device embodying the present invention, generally designated by the number 10, which, as shown in FIG. 1, is mounted on the ledge behind the back seat in the passenger compartment of a car 30. The device includes a generally L-shaped, rectangular housing 11. As can be seen best in FIG. 3, housing 11 includes a generally rectangular, hollow base 12, having a top face 13, the front portion of which serves as a ledge and a removable bottom face 14. A generally rectangular, hollow member 15 extends upwardly from the rear portion of top face 13 of base 12 and also includes a top face 16, which serves as a ledge. Member 15 also includes a front face 17, having an upper fixed end, which is attached to the forward end of top face 16 and a lower, free end, which is provided with a downwardly opening, U-shaped track 18, which opposes an upwardly-opening, U-shaped track 19, mounted on the top face 13 of base 12. A generally rectangular, translucent message board 20 is slidably received between the two, U-shaped track members 18, 19 and carries an appropriate message thereon.

A clock assembly, generally designated by the number 31, is mounted on top face 16 of member 15, and includes a clock housing 32, which supports a numbered clock dial 33, having manually-movable hands 35 thereon. As can be appreciated, message board 20 and clock assembly 31 may be used by the driver to leave a message for any stopping motorist or policeman, that he will be back at a certain time. Message board 20 may also contain other messages, such as "Emergency Stop," "Battery Dead," "Calling a Mechanic," etc., and front face 17 may also contain some general message, such as "Police and Drivers."

A light bulb 21, covered by a transparent globe 22, is mounted on the rearward portion of top face 13 of base 12, directly behind message board 20, in order to effect illumination thereof. Similarly, two, spaced-apart light bulbs 23, each covered by a red colored, transparent or translucent dome 24, are mounted on the forward portion of the top face 13 of base 12, spaced apart from one another; the latter two light bulbs 23, serving as an emergency flashing signal.

As can be seen in FIG. 3, a flasher 34 is supported on the lower surface of top face 13 of base 11 and a battery 25 is supported on removable, bottom face 14 of base 12. In addition, a switch 26 is mounted on top face 16 of member 15.

Figure 4:
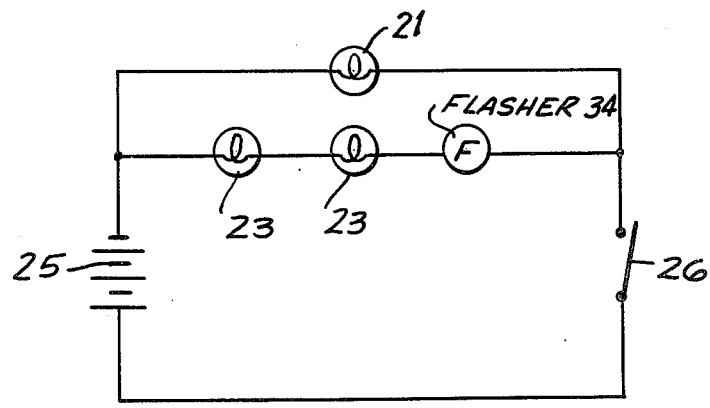
FIG. 4 is a schematic electrical wiring diagram for the various components of the device.

As shown in FIG. 4, the two light bulbs 23 are connected in series with flasher 34 and this assembly is, in turn, connected in parallel with light bulb 21. The parallel circuit is, in turn, coupled to one terminal of battery 25 and the other end of the parallel circuit is attached to one lead of switch 26; the other lead of switch 26 being connected to the other terminal of battery 25.

As can be appreciated, by turning switch 26 to an "on" position, the lights will be turned on with light bulb 21 being constantly illuminated and light bulbs 23 being flashed on and off by flasher 34.

Thus, if an emergency exists, the driver simply mounts the device 10 on either the dashboard or ledge behind the back seat of car 30, and turns the switch on to signal an emergency situation; this, in turn, causing light bulbs 23 to flash on and off. If the driver decides to leave the car to get help, he can then leave an appropriate message on the message board 20, and also set the clock assembly 31 to indicate what time he intends to return.

While only one embodiment of the invention has been shown and described, it will be obvious to those persons of ordinary skill in the art, that many changes and modifications may be made thereunto, without departing from the spirit and scope of the invention.

What is claimed is:

1. A portable emergency signaling device comprising:
   a portable relatively lightweight, hollow housing having an opening therein;
   a translucent message board slidably mounted on said housing across said opening thereof and having an emergency message imprinted thereon;
   clock dial means mounted on said housing for use in association with said message board and for establishing a time reference relative to the message on said message board;
   a first light source mounted within said housing and disposed behind said message board for effecting illumination thereof;
   at least one second light source mounted on said housing for signaling a distress signal, and connected in parallel with said first light source;
   a flasher mounted within said housing and serially connected to said at least one second light source;
   an electrical power source mounted within said housing and serially connected to said flasher and light sources; and
   switch means mounted on said housing and serially connected to said power source, light sources and flasher for activating and deactivating the device.

2. The device according to claim 1, wherein said housing has a generally L-shaped, elongated configuration and includes a generally rectangular, hollow base, having a top face, the forward portion of which serves as a ledge, and a generally rectangular hollow member connected to and extending upwardly from the rear portion of the top face of said base, said member having a top face which serves as a ledge and a front face disposed adjacent to said forward portion of said top face of said base, in which said opening is defined, said front face including means for slidably mounting said message board across said opening thereof.

3. The device according to claim 2, wherein said clock means and said switch means are mounted on said top face of said member of said housing, wherein said flasher and power source are mounted within said base, wherein said first light source is mounted within said member behind said message board, and wherein said at least one second light source is mounted on said forward portion of said top face of said base.

4. The device according to claim 3, wherein said device also includes an additional light source mounted on said forward portion of said top face of said base, spaced from said at least one second light source.

5. The device according to claim 4, additionally including a red-colored, translucent dome covering said at least one second light source and said additional light source.

6. The device according to claim 1, wherein said electrical power source comprises a battery and said light sources comprise light bulbs.

7. The device according to claim 2, wherein said base has a removable bottom face.

8. A portable emergency signaling device comprising:
   a relatively lightweight, hollow housing having an opening therein, said housing having a generally L-shaped, elongated configuration and including a generally rectangular, hollow base, having a top face, the forward portion of which serves as a ledge, and a generally rectangular, hollow member connected to, and extending upwardly from the rear portion of the top face of said base, said member having a top face which serves as a ledge and a front face disposed adjacent to said forward portion of said top face of said base, in which said opening is defined;
   a translucent message board slidably mounted on said housing across said front face of said opening thereof and having an emergency message imprinted thereon;
   clock dial means mounted on the top face of said member of said housing for use in association with said message board and for establishing a time reference relative to the message on said message board;
   a first light source mounted within said member of said housing and disposed behind said message board for effecting illumination thereof;
   at least two dome-covered second light sources mounted in spaced-apart relationship on said forward portion of said top face of said base for signaling a distress signal, and connected in parallel with said first light source;
   a flasher mounted within said base of said housing and serially connected to said second light sources;
   an electrical power source comprising a battery mounted within said base of housing and serially connected to said flasher and light sources; and
   switch means mounted on the top face of said member of said housing and serially connected to said power source, light sources and flasher for activating and deactivating the device.

* * * * *